United States Patent
Seo et al.

(10) Patent No.: US 7,700,683 B2
(45) Date of Patent: Apr. 20, 2010

(54) COLOURABLE BINDER COMPOSITION

(75) Inventors: Akira Seo, Tokyo (JP); Hayato Hirayama, Tokyo (JP)

(73) Assignee: Shell Oil Company, Houston, TX (US)

( * ) Notice: Subject to any disclaimer, the term of this patent is extended or adjusted under 35 U.S.C. 154(b) by 66 days.

(21) Appl. No.: 12/095,093

(22) PCT Filed: Nov. 27, 2006

(86) PCT No.: PCT/EP2006/068946

§ 371 (c)(1), (2), (4) Date: Oct. 13, 2008

(87) PCT Pub. No.: WO2007/060241

PCT Pub. Date: May 31, 2007

(65) Prior Publication Data

US 2009/0111914 A1    Apr. 30, 2009

(30) Foreign Application Priority Data

Nov. 28, 2005   (JP) .............................. 2005-342574

(51) Int. Cl.
*C08L 57/02* (2006.01)

(52) U.S. Cl. ........................ 524/499; 524/270; 524/271; 524/274

(58) Field of Classification Search ................. 524/270, 524/271, 274, 474, 499
See application file for complete search history.

(56) References Cited

U.S. PATENT DOCUMENTS

2005/0187327 A1*   8/2005   Trommelen et al. ......... 524/425

FOREIGN PATENT DOCUMENTS

| EP | 304767     | 3/1989  |
|----|------------|---------|
| JP | 11349816   | 12/1999 |
| JP | 2001172469 | 6/2001  |
| JP | 2001329117 | 11/2001 |
| JP | 2002206047 | 7/2002  |
| JP | 2003301111 | 10/2003 |

OTHER PUBLICATIONS

International Search Report (PCT/EP2006/068946).

* cited by examiner

*Primary Examiner*—Peter Szekely

(57) ABSTRACT

A colourable binder composition with both excellent durability and application properties when used in coloured paving is provided. It contains 20-40 weight % in total of hydrogenated petroleum resin and non-hydrogenated petroleum resin, 1-10 weight % of hydrogenated thermoplastic elastomer of percentage hydrogenation 95% or more and 0.1-5 weight % in total of tall oil derivative of acid value 50-300 and/or tall oil fatty acid of acid value 50-300, the remainder being made up of petroleum solvent-extracted oil, has a composition wherein the ratio of the aforesaid hydrogenated petroleum resin to the aforesaid non-hydrogenated petroleum resin (hydrogenated petroleum resin/non-hydrogenated petroleum resin) (weight ratio) is 10-30%, moreover, the viscosity at 150° C. is 500 mPa·sec or less, and the DS value of a mixture of dense granularity (13) is 1 500 times/min or more.

20 Claims, No Drawings

COLOURABLE BINDER COMPOSITION

The present application claims priority from Japanese Patent Application 2005-342574 filed 28 Nov. 2005.

FIELD OF THE INVENTION

The present invention relates to a binder composition colourable by addition of pigments or the like, and in particular it relates to a colourable binder composition suitable for use as coloured paving which is applied in parks and pavements.

BACKGROUND OF THE INVENTION

In general, when coloured paving is applied in parks or pavements, binder compositions which can be coloured by the addition of pigments and the like are used. Such binder compositions for coloured paving include for example those wherein a petroleum resin and/or a thermoplastic elastomer and a petroleum-based softener are compounded in defined proportions, and antioxidants and the like are added if necessary.

Since binder compositions for coloured paving are usually exposed outside for long periods, it is necessary to suppress deterioration due to water, heat, oil and ultraviolet radiation to the minimum. Thus, in order to improve weather resistance, binder compositions for coloured paving have been proposed (see for example JP 2001-172469 and JP 2001-329117) wherein, as the petroleum resin and thermoplastic elastomer, respectively, hydrogenated petroleum resin and hydrogenated thermoplastic elastomer in which the double bonds in the molecule have been decreased by addition of hydrogen are used. Further, binder compositions for coloured paving have also been proposed (see for example JP 2002-206047) wherein, together with the use of the aforesaid hydrogenated petroleum resin and hydrogenated thermoplastic elastomer, the softener is changed from a petroleum solvent-extracted oil to a petroleum-based lubricating oil of low aromatics and double bond content.

On the other hand, there are also binder compositions for coloured paving which take account of effects on the environment and on the human body (see for example JP 2003-301111 and JP 2005-256450). In the binder composition according to JP 2003-301111, a petroleum-based heavy oil wherein the polycyclic aromatic hydrocarbon content has been decreased to 3 weight % or less, and the aromatics content to 15 weight % or less is used as the softener. Further, in the binder composition according to JP 2005-256450, a petroleum aromatic hydrocarbon oil wherein the polycyclic aromatic hydrocarbon content has been decreased to less than 3 weight % is used as the softener.

However, as described below, there are problems with the aforesaid previous technology. Although studies have been made of the weather resistance, durability and colour of the coloured paving binder compositions according to the prior art, their application properties have not been considered. For example, in order to improve their service durability, it is desirable if the viscosity of the binder composition is higher, however in that case the viscosity during application also becomes higher, mixing with the pigment and aggregate may become incomplete, and the flatness of the paved surface may decrease. On the other hand, if the viscosity of the binder composition is decreased in order to improve its application properties, its strength decreases, and loss of aggregate, rut formation and the like occur. Because of this, there are problems with previous coloured paving binder compositions in that it is not possible to have both the durability and the application properties satisfactory.

SUMMARY OF THE INVENTION

The present invention was devised in the light of the aforesaid problems, and its purpose is to provide a colourable binder composition with both excellent durability and application properties when used in coloured paving.

The colourable binder composition of the present invention is characterised in that it contains 20-40 weight % in total of hydrogenated petroleum resin and non-hydrogenated petroleum resin, 1-10 weight % of hydrogenated thermoplastic elastomer of percentage hydrogenation 95% or more and 0.1-5 weight % in total of tall oil derivative of acid value 50-300 and/or tall oil fatty acid of acid value 50-300, the remainder being made up of petroleum solvent-extracted oil, and having a composition wherein the ratio of the aforesaid hydrogenated petroleum resin to the aforesaid non-hydrogenated petroleum resin (hydrogenated petroleum resin/non-hydrogenated petroleum resin) (weight ratio) is 10-30%, the viscosity at 150° C. is 500 mPa·sec or less, and the DS value of a mixture of dense granularity (13) is 1 500 times/min or more.

In the present invention, since the content of each component is optimised, and both non-hydrogenated petroleum resin and hydrogenated petroleum resin are used together, moreover the mixing ratio of these is optimised, and the viscosity at 150° C. is set at 500 mPa·sec or less, the application properties are good. Further, since, when a mixture of dense granularity (13) is made, the DS (dynamic stability) value is 1 500 times/min or more, the durability is excellent. It should be noted that the 'mixture of dense granularity (13)' referred to here is a mixture with the same aggregate incorporation as the dense granularity asphalt mixture according to 'Technical Standards and Comments Relating to the Structure of Paving (publ. Japanese Roads Association)' and made with 5.1 weight % of binder. Moreover, since hydrogenated petroleum resin and hydrogenated thermoplastic elastomer with few double bonds in the molecules are used in the colourable binder compositions of the present invention, deterioration due to ultraviolet radiation, water content and the like can be suppressed. Furthermore, since there are few volatile components, unsaturated components and readily decomposed components in this binder composition, there is little creation of odour even if it is heated during application.

Further, the proportion of the aforesaid hydrogenated petroleum resin to the aforesaid non-hydrogenated petroleum resin (hydrogenated petroleum resin/non-hydrogenated petroleum resin) is preferably 15-20%. By this means, the viscosity at high temperature is lowered, and the application properties can be made more satisfactory.

Moreover, the colourable binder composition of the present invention can be used in coloured paving. By this means, mixing with aggregate and pigment is facilitated, and also the paved surface is flat, and coloured paving displaying satisfactory durability, even outdoors, is obtained.

By means of the present invention, since, through the simultaneous use of non-hydrogenated petroleum resin and hydrogenated petroleum resin and the optimisation of the mixing ratio thereof, the viscosity at 150° C. is 500 mPa·sec or less, and the DS value of a mixture of dense granularity

(13) is 1 500 times/min or more, it is possible to improve the application properties without decreasing the durability in service.

DETAILED DESCRIPTION OF THE INVENTION

Below, optimal modes for implementation of the present invention are explained in detail. The colourable binder composition of the present invention (referred to below simply as 'binder composition') contains 20-40 weight % in total of hydrogenated petroleum resin and non-hydrogenated petroleum resin, 1-10 weight % of hydrogenated thermoplastic elastomer of percentage hydrogenation 95% or more and 0.1-5 weight % in total of tall oil derivative of acid value 50-300 and/or tall oil fatty acid of acid value 50-300, the remainder being made up of petroleum solvent-extracted oil. Also, the binder composition of the present invention has a viscosity at 150° C. of 500 mPa·sec or less, and the DS value of a mixture of dense granularity (13) is 1 500 times/min or more.

Below, the reasons for the numerical limits in the binder composition of the present invention are explained.

Viscosity at 150° C., 500 mPa·sec or less: Binder compositions for paving are normally heated to about 150-200° C. at the time of application. If the viscosity of the binder composition at this time is high, the operations of mixing with aggregate such as stones and with pigment may become difficult, and it may become impossible to ensure the flatness of the paved surface. Hence, in the binder composition of the present invention, the viscosity at 150° C. is set at 500 mPa·sec or less. By this means, it is possible to improve the application properties.

DS value of a mixture of dense granularity (13), 1 500 times/min or more: In order to ensure the durability of the paving, it is desirable that the viscosity of the binder composition be high during service. If it is outdoors, the temperature of the paved surface in the summer season may rise to 50-60° C. Hence, the DS value when a mixture of dense granularity (13) is made in the binder composition of the present invention is set at 1 500 times/min or more. This DS value is a value indicating the resistance of paving materials such as asphalt to plastic flow (plastic deformation wheel number), and is normally represented as number of passages of a test wheel per 1 mm rut-forming deformation when a wheel tracking test is performed. Also, in the present invention a 'mixture of dense granularity (13) ' is a mixture wherein aggregate is incorporated into a binder composition of the present invention such that the aggregate incorporation is the same as in an asphalt mixture of dense granularity (13) and the binder weight is 5.1 weight %. Here, the binder weight in the mixture of dense granularity (13) is defined because, normally, in dense granularity asphalt mixtures, even if the incorporation of aggregate (made by breaking a mountainside to rubble, and grading to a specified granularity by passing through sifters) is the same, the quantity of binder incorporated differs depending on the composition of the binder used, the source of the aggregate producing district and stone-breaking works. If the DS value of this mixture of dense granularity (13) is less than 1 500 times/min, the strength decreases, and damage such as rut formation in the paving during service occurs.

Hydrogenated petroleum resin and non-hydrogenated petroleum resin, total weight 20-40 weight %: Petroleum resin is a polymer of unsaturated hydrocarbons present in thermal decomposition residues in the petroleum refining process, and is a pale yellow material of molecular weight about 100-2 000, generally 200-1 500, with a softening point of about 60-150° C. The product of adding hydrogen to double bonds in the molecules of such non-hydrogenated petroleum resin is hydrogenated petroleum resin, and the softening point of this hydrogenated petroleum resin is usually about 90-130° C. These hydrogenated petroleum resin and non-hydrogenated petroleum resin are components acting as structural elements in the binder compositions, but if the total content thereof is less than 20 weight % based on the total weight of the binder composition, the binder strength decreases, and the durability of the paving becomes lower. On the other hand, if the total content of hydrogenated petroleum resin and non-hydrogenated petroleum resin exceeds 40 weight % based on the total weight of the binder composition, the granularity of the binder increases, and application becomes difficult.

Further, if the proportion of hydrogenated petroleum resin to non-hydrogenated petroleum resin (hydrogenated petroleum resin/non-hydrogenated petroleum resin) is less than 10% by weight, the viscosity at 150° C. exceeds 500 mPa·sec, and flatness of the paving surface at the time of application cannot be ensured. On the other hand, since there is polarisation of the electrons in the double bond regions in the resin molecules, intramolecular polarity, albeit weak, is produced in the non-hydrogenated petroleum resin, in which double bonds are present, and the bonding forces between binder and aggregate are increased by this intra-molecular polarity. Because of this, if the proportion of hydrogenated petroleum resin, wherein the double bonds in the molecule have been decreased, becomes greater, and, specifically, if the proportion of hydrogenated petroleum resin to non-hydrogenated petroleum resin (hydrogenated petroleum resin/non-hydrogenated petroleum resin) exceeds 30% by weight, the polarity in the resin molecules decreases and the hydrogen bonding between binder and aggregate becomes weak. As a result of this, the retained stability decreases, it is more readily affected by rainwater and the like during service, and its durability decreases. Hence, the total content of hydrogenated petroleum resin and non-hydrogenated petroleum resin is set at 20-40 weight %, based on the total weight of binder composition, moreover the proportion of hydrogenated petroleum resin to non-hydrogenated petroleum resin (hydrogenated petroleum resin/non-hydrogenated petroleum resin) is set at 10-30% by weight. Also, the proportion of hydrogenated petroleum resin to non-hydrogenated petroleum resin (hydrogenated petroleum resin/non-hydrogenated petroleum resin) is preferably set at 15-20%, and as a result of this it is possible to decrease the high temperature viscosity, and to further improve the application properties.

Hydrogenated thermoplastic elastomer, 1-10 weight %: The hydrogenated thermoplastic elastomer is the product of addition of hydrogen to the double bonds of diene blocks in the molecules of the non-hydrogenated thermoplastic elastomer, and is a component which acts as a structural element, and also contributes to the flexibility of the binder composition. However, if the content of hydrogenated thermoplastic elastomer is less than 1 weight %, based on the total weight of the binder composition, the strength and flexibility of the binder decrease, and the paving is impaired. On the other hand, if the content of hydrogenated thermoplastic elastomer exceeds 10 weight %, based on the total weight of the binder composition, the viscosity of the binder composition increases and application becomes difficult. Hence, the hydrogenated thermoplastic elastomer content is set at 1-10 weight %.

Further, provided that the percentage hydrogenation of the hydrogenated thermoplastic elastomer incorporated in the binder composition of the present invention is 95% or more, there is no particular restriction as to its nature, however, preferably, it is a linear or branched copolymer wherein the terminal segments are polystyrene segments, and the rubber component segments are segments not containing double bonds, such as polyethylene and polybutylene. As such hydrogenated thermoplastic elastomers, for example SEBS (styrene-ethylene-butylene-styrene block copolymers), SEPS (styrene-ethylene-propylene-styrene copolymers) and the like are mentioned. Further, among these block copolymers, those wherein the molecular weight is 50 000 or more, the MFR (melt flow rate) (200° C., 5 kg) is 10 g/min or less, the polystyrene content is 10-50 weight %, and the specific gravity is 0.9 or more are more preferable. It should be noted that if the percentage hydrogenation of the hydrogenated thermoplastic elastomer is less than 95%, it is subject to deterioration due to ultraviolet radiation during service, and the durability of the paving decreases markedly, hence the percentage hydrogenation of the hydrogenated thermoplastic elastomer is set at 95% or more.

Tall oil derivative and/or tall oil fatty acid, total weight 0.1-5 weight %: The tall oil derivative and tall oil fatty acid are components which have the effect of improving the durability of the paving by increasing the adhesion of binder composition and aggregate. Further, compared to maleic anhydride, maleated organic compounds and amine-based components which similarly have the effect of increasing the adhesion of binder composition and aggregate, the tall oil derivatives and tall oil fatty acids have lower corrosiveness and explosiveness, and also there is no risk of occurrence of unpleasant odours when the binder composition is produced. However, if the content of tall oil derivative and tall oil fatty acid is less than 0.1 weight %, based on the total weight of the binder composition, the adhesive force between binder composition and aggregate becomes inadequate, and the water resistance-improving effect is not obtained. On the other hand, if the total content of tall oil derivative and tall oil fatty acid exceeds 5 weight %, based on the total weight of the binder composition, the viscosity of the composition decreases, and the durability and DS value of the paving decrease. Hence, in the binder composition of the present invention, at least one of the tall oil derivative and tall oil fatty acid is incorporated such that the content thereof (the total content of these if several are added) is 0.1-5 weight %, based on the total weight of the binder composition.

Further, tall oil derivatives and tall oil fatty acids are generally obtained from waste liquids, and oily side-products made up of resins acids, fatty acids and the like, when sulphate pulp or soda pulp are produced, but in the present invention, from such tall oil derivatives and tall oil fatty acids, those with an acid number of 50-300 are selected and used. If tall oil derivatives and/or tall oil fatty acids of acid number less than 50 are used, the effect of increasing adhesion to the aggregate is not obtained, and detachment of binder and aggregate occurs. As a result, satisfactory durability in service is not obtained. On the other hand, if tall oil derivatives and/or tall oil fatty acids of acid number exceeding 300 are used, compatibility with other components decreases, and it becomes difficult to produce a homogeneous binder composition.

The component in the binder compositions of the present invention other than the aforesaid, in other words, the remainder, is petroleum solvent-extracted oil. Petroleum solvent-extracted oil is an extracted oil produced in a solvent-extraction process when lubricating oil is produced from crude oil, and is an oily substance rich in aromatic fractions and naphthenic fractions (see 'Routes to Petroleum Products', Fig. 6-1 'Common lubricating oil production processes', Publ. Petroleum Federation, November 1971, p. 99). This petroleum solvent-extracted oil is a component which acts as a softener in the binder composition, and it preferably has a boiling point of 350° C. or higher, viscosity at 100° C. 5-100 mPa·sec, flash point 240° C. or above, and total content of aromatic compounds and naphthenic compounds 45 weight % or more, based on the total weight of the petroleum solvent-extracted oil (test method specified in Petroleum Institute Standard JPI-5S-22-83). Such petroleum solvent-extracted oils include for example bright stock solvent-extracted fractions extracted in the crude oil refining process with solvents such as phenol, N-methylpyrrolidone, liquid sulphur dioxide and furfural.

Further, in addition to the various components described above, various additives such as lubricating oils can be incorporated in the binder composition of the present invention for viscosity regulation, transparency improvement and the like.

In the binder composition of the present invention, through the simultaneous use of a non-hydrogenated petroleum resin and hydrogenated petroleum resin, and the optimisation of the mixing ratio of these, the viscosity at high temperatures is decreased, while the viscosity in the service temperature range (about 50-60° C.) is increased, and the DS value of a mixture of dense granularity (13) is increased, hence it is possible to improve the application properties without decreasing the service durability. Further, since hydrogenated petroleum resin and hydrogenated thermoplastic elastomer with few double bonds in the molecules are used in the binder composition of the present invention, deterioration due to ultraviolet radiation, moisture and the like can be suppressed, and rut formation and scattering of aggregate can be prevented even if it is used in paving applications. Furthermore, since there are few volatile components and unsaturated components in the binder composition of the present invention, and the hydrogenated petroleum resin and hydrogenated thermoplastic elastomer do not readily decompose, there is less odour production than with existing binder compositions, even with heating at the time of application.

Now, the colourable binder compositions of the present invention are not limited to coloured paving applications and can also be used in natural exposure paving applications with no addition of pigment, and, apart from paving applications, can also be used as roofing sheet, sealing material and pipe coating material.

EXAMPLES

Below, the effects of the present invention are specifically explained by the presentation of practical examples and comparison examples. In the present practical examples, the various components were incorporated in the compositions shown in Table 1 below, and mixed in a homogeniser at 180° C. and a revolution rate of 3 000 rpm. Also, the mixing was ended at the time point when a fraction passing through a 1.18 mm sieve was no longer observed. Also, in the present practical examples, as the non-hydrogenated petroleum resin (NHPR), a petroleum resin based on C9 cut as raw material, of softening point 140° C., JIS K0070-specified acid number 0.1 mg KOH, JIS K2543-specified bromine number 25 g, and polyethylene-converted average molecular weight measured by GPC method ca. 1000, was used. Further, as the hydrogenated petroleum resin (HPR), the hydrogenation product from a petroleum resin based on dicyclopentadiene (DCPD) as raw material, of softening point 130° C., and JIS K2543-specified bromine number 3 g was used. Moreover, as the hydrogenated thermoplastic elastomer (HTPE), a styrene-ethylene-butylene-styrene block copolymer of specific gravity 0.91, hardness (Shore A) 76, ASTM D412-specified 300% modulus 62 kg/cm$^2$, ASTM D412-specified tensile strength 330 kg/cm², and solution viscosity of 10 weight % polymer concentration toluene solution 1000 mPa·sec at 25° C., was used. Further, a tall oil derivative (TOD) with a JIS K0070-specified acid number of 190 mg KOH was used. Also, a petroleum solvent-extracted oil (PSEO) of viscosity at 100° C. 68 mPa·sec, aromatic fraction 33 weight %, naphthenic fraction 26 weight %, paraffinic fraction 41 weight % and flash point 254° C. was used.

TABLE 1

| | Composition (weight) | | | | | |
|---|---|---|---|---|---|---|
| | NHPR | HPR | HTPE | TOD | PSEO | HPR/NHPR |
| Pract. Ex. 1 | 28.0 | 5.0 | 3.0 | 0.5 | 63.5 | 17.9% |
| Pract. Ex. 2 | 28.0 | 5.0 | 2.5 | 0.5 | 64.0 | 17.9% |
| Pract. Ex. 3 | 27.0 | 6.5 | 3.0 | 0.5 | 63.0 | 24.0% |
| Pract. Ex. 4 | 26.0 | 7.5 | 2.5 | 0.5 | 63.5 | 28.8% |
| Comp. Ex. 1 | 31.5 | 0 | 3.5 | 0.5 | 64.5 | 0% |
| Comp. Ex. 2 | 29.5 | 2.5 | 3.0 | 0.5 | 64.5 | 8.5% |
| Comp. Ex. 3 | 24.5 | 10.0 | 2.5 | 0.5 | 62.5 | 40.8% |
| Comp. Ex. 4 | 15.0 | 3.0 | 3.0 | 0.5 | 78.5 | 20.0% |
| Comp. Ex. 5 | 35.0 | 10.0 | 3.0 | 0.5 | 51.5 | 28.6% |
| Comp. Ex. 6 | 28.5 | 5.0 | 0.5 | 0.5 | 64.0 | 17.9% |
| Comp. Ex. 7 | 15.0 | 4.0 | 15.0 | 0.5 | 64.0 | 26.7% |
| Comp. Ex. 8 | 28.0 | 5.0 | 3.0 | 0.05 | 63.95 | 17.9% |
| Comp. Ex. 9 | 28.0 | 5.0 | 3.0 | 6.0 | 58.0 | 17.9% |

Next, the penetration, softening point and the viscosity at 150° C. were measured, and wheel tracking tests and Marshal stability tests performed, on each binder composition of the practical examples and comparison examples made by the aforesaid method. During this, the penetration and softening point were measured by the methods specified in JIS K2207. Also, the viscosity at 150° C. was measured by the method specified in JPI-5S-54-99.

Further, for the wheel tracking tests, aggregates were used so as to make a dense granularity asphalt mixture (13) compound with each binder composition, sheet-shaped specimens of length 30 cm, width 30 cm and depth 5 cm, made such that the binder content was 5.1 weight % were used, and the tests were performed by the method described in the Paving Test Methods Handbook (Ed.: Japanese Roads Association). It has been experimentally confirmed that Japanese roads reach a temperature of about 60° C. in the summer season. If vehicles pass over it in this condition, fluid deformation, rut formation and the like occur. The wheel tracking test is a test devised for the experimental confirmation of the extent to which this rutting occurs, and is a test which is performed for the assessment of the dynamic stability which is an index of flow resistance in paving material. Specifically, a tyre subjected to a specified load was run backwards and forwards over the test sample (specimen) for 1 hr, and the amount of deformation measured. Then, on the basis of the following numerical formula, the DS value was calculated from the amount of deformation between 45 mins and 60 mins from the start of the test. It should be noted that if the DS value determined from the following numerical formula is larger, the amount of deformation is smaller, and the material can be stated to be more resistant to rut formation. Hence, in the present practical examples, on the basis of the standards stated in the 'Technical Standards and Comments Relating to the Structure of Paving (publ. Japanese Roads Association)', a DS value of 1500 times/min was taken as a pass.

$$DS \text{ value (times/min)} = \frac{\text{No. of tyre passes from 45 mins to 60 mins (revs)}}{\text{Amount of deformation from 45 mins to 60 mins (mm)}} \quad \text{Formula 1}$$

Further, for the Marshall stability test, aggregates were used so as to make a dense granularity asphalt mixture (13) compound with each binder composition, cylindrical pieces of diameter 10.16 cm and height 6.35 cm made such that the binder content was 5.1 weight % were used, and the tests performed by the method described in the Paving Test Methods Handbook (Ed.: Japanese Roads Association). In the present practical examples, the standard Marshall stability test and immersion Marshall stability test were performed for each specimen, and the retained stability of each binder composition was determined from these results on the basis of the following numerical formula 2. In the standard Marshall stability test, the test sample (specimen) is immersed in water at 60° C. for 30 mins, and its compressive strength then measured, and in the immersion Marshall stability test, the test sample (specimen) is immersed in water at 60° C. for 48 hrs, and its compressive strength then measured. From this, the decrease in strength of the test sample (specimen) due to water can be ascertained. In the 'Technical Standards and Comments Relating to the Structure of Paving (publ. Japanese Roads Association, p. 82), for example, it is stated that it is desirable that mixtures used as road paving materials should have a retained stability of 75% or more. Hence, in the present practical examples, more stringently than in the standards stated in the 'Technical Standards and Comments Relating to the Structure of Paving (publ. Japanese Roads Association)', a retained stability of 80% or more was taken as a pass. The above results are summarised in Table 2 below.

TABLE 2

$$\text{Retained stability (\%)} = \frac{\text{Immersion Marshall stability}}{\text{Standard Marshall stability}} \times 100 \quad \text{Formula 2}$$

| | Penetration (0.1 mm) | Softening Pt. (° C.) | Viscosity [150° C.] (mPa · sec) | DS value [times/min] | Retained stability (%) |
|---|---|---|---|---|---|
| Pract. Ex. 1 | 76 | 67.0 | 450 | 2900 | 85 or more |
| Pract. Ex. 2 | 73 | 59.5 | 300 | 2800 | 85 or more |
| Pract. Ex. 3 | 73 | 67.5 | 450 | 2600 | 85 or more |
| Pract. Ex. 4 | 79 | 60.0 | 275 | 2600 | 85 or more |
| Comp. Ex. 1 | 75 | 65.0 | 673 | 2800 | 85 or more |
| Comp. Ex. 2 | 75 | 66.0 | 600 | 2700 | 85 or more |
| Comp. Ex. 3 | 77 | 61.0 | 273 | 2400 | 75.5 |
| Comp. Ex. 4 | 200 or more | — | 105 | 315 | — |
| Comp. Ex. 5 | 10 | 91.0 | 800 | — | — |

TABLE 2-continued $$\text{Retained stability (\%)} = \frac{\text{Immersion Marshall stability}}{\text{Standard Marshall stability}} \times 100 \quad \text{Formula 2}$$

|  | Penetration (0.1 mm) | Softening Pt. (° C.) | Viscosity [150° C.] (mPa · sec) | DS value [times/min] | Retained stability (%) |
|---|---|---|---|---|---|
| Comp. Ex. 6 | 85 | 44.0 | 90 | 400 | 80.0 |
| Comp. Ex. 7 | 62 | 105.0 | 10000 or more | — | — |
| Comp. Ex. 8 | 76 | 67.0 | 450 | 2900 | 62.0 |
| Comp. Ex. 9 | 88 | 58.5 | 360 | 1200 | — |

As shown in Table 2 above, for both the binder composition of Comparison Example 1, in which no hydrogenated petroleum resin was incorporated, and the binder composition of Comparison Example 2, in which the ratio of hydrogenated petroleum resin to non-hydrogenated petroleum resin (hydrogenated petroleum resin/non-hydrogenated petroleum resin) was less than 10%, the viscosity at 150° C. exceeded 500 mPa·sec. Hence, the application properties of the binder compositions of Comparison Examples 1 and 2 were poor, and it was difficult to ensure the flatness of the paved surface. Further, with the binder composition of Comparison Example 3, in which the ratio of hydrogenated petroleum resin to non-hydrogenated petroleum resin (hydrogenated petroleum resin/non-hydrogenated petroleum resin) exceeded 40%, the retained stability was now less than 80%, and it was easily affected by rain water while in use.

With the binder composition of Comparison Example 4, in which the total content of hydrogenated petroleum resin and non-hydrogenated petroleum resin was less than the range of the present invention, the penetration was large, at 200 or more, and the DS value was less than 1500 times/min, hence its strength and the durability of the paving were extremely low. On the other hand, with the binder composition of Comparison Example 5, in which the total content of hydrogenated petroleum resin and non-hydrogenated petroleum resin exceeded the range of the present invention, and the binder composition of Comparison Example 7, in which the content of hydrogenated thermoplastic elastomer of percentage hydrogenation 95% or more exceeded the range of the present invention, the viscosity at 150° C. greatly exceeded 500 mPa·sec, and their application properties were markedly impaired. Further, the viscosity of these binder compositions was too high, and specimens for the wheel tracking test and Marshall stability test could not be made. Further, with the binder composition of Comparison Example 6, in which the content of hydrogenated thermoplastic elastomer of percentage hydrogenation 95% or more was less than the range of the present invention, the DS value was less than 1500 times/min, hence its strength was low. Moreover, with the binder composition of Comparison Example 8, in which the content of tall oil derivative was less than the range of the present invention, the retained stability was less than 80%, and it was easily affected by rain water while in use. On the other hand, with the binder composition of Comparison Example 9, in which the content of tall oil derivative exceeded the range of the present invention, the DS value was less than 1500 times/min, hence its strength was low.

In contrast to this, with the binder compositions of Practical Examples 1-4 which were within the range of the present invention, the viscosity at 150° C. was 500 mPa·sec or less, and their application properties were excellent. Further, with the binder compositions of Practical Examples 1-4, the DS values were high, 2600 times/min or more, and the retained stability was also 85% or more. Thus, compared to the binder compositions of the Comparison Examples, the strength, durability and application properties of the binder compositions of Practical Examples 1-4, made within the range of the present invention were all excellent.

What is claimed is:

1. A colourable binder composition wherein it contains 20-40 weight % in total of hydrogenated petroleum resin and non-hydrogenated petroleum resin, 1-10 weight % of hydrogenated thermoplastic elastomer of percentage hydrogenation 95% or more and 0.1-5 weight % in total of tall oil derivative of acid value 50-300 and/or tall oil fatty acid of acid value 50-300, the remainder being made up of petroleum solvent-extracted oil, and having a composition wherein the ratio of the aforesaid hydrogenated petroleum resin to the aforesaid non-hydrogenated petroleum resin (hydrogenated petroleum resin/non-hydrogenated petroleum resin) (weight ratio) is 10-30%, the viscosity at 150° C. is 500 mPa·sec or less, and the DS value of a mixture of dense granularity (13) is 1 500 times/min or more.

2. The colourable binder composition according to claim 1, wherein the ratio of the aforesaid hydrogenated petroleum resin to the aforesaid non-hydrogenated petroleum resin (hydrogenated petroleum resin/non-hydrogenated petroleum resin) is 15-20%.

3. The colourable binder composition according to claim 1, wherein the hydrogenated thermoplastic elastomer is a linear or branched copolymer having terminal segments that are polystyrene segments, and rubber component segments that are polyethylene, polybutylene or polypropylene.

4. The colourable binder composition according to claim 1, wherein the petroleum solvent-extracted oil has a boiling point of 350° C. or higher, viscosity at 100° C. 5-100 mPa·sec, flash point 240° C. or above, and total content of aromatic compounds and naphthenic compounds 45 weight % or more, based on the total weight of the petroleum solvent-extracted oil.

5. The colourable binder composition according to claim 4, wherein the petroleum solvent-extracted oil is a bright stock solvent-extracted fraction extracted in the crude oil refining process.

6. A paving composition comprising a colourable binder composition according to claim 1, and aggregate.

7. A colour paving composition comprising a colourable binder composition according to claim 1, aggregate and pigment.

8. The colourable binder composition according to claim 2, wherein the hydrogenated thermoplastic elastomer is a linear or branched copolymer having terminal segments that are polystyrene segments, and rubber component segments that are polyethylene, polybutylene or polypropylene.

9. The colourable binder composition according to claim 2, wherein the petroleum solvent-extracted oil has a boiling point of 350° C. or higher, viscosity at 100° C. 5-100 mPa·sec, flash point 240° C. or above, and total content of aromatic compounds and naphthenic compounds 45 weight % or more, based on the total weight of the petroleum solvent-extracted oil.

10. The colourable binder composition according to claim 3, wherein the petroleum solvent-extracted oil has a boiling point of 350° C. or higher, viscosity at 100° C. 5-100 mPa·sec, flash point 240° C. or above, and total content of aromatic compounds and naphthenic compounds 45 weight % or more, based on the total weight of the petroleum solvent-extracted oil.

11. The colourable binder composition according to claim 9, wherein the petroleum solvent-extracted oil is a bright stock solvent-extracted fraction extracted in the crude oil refining process.

12. The colourable binder composition according to claim 10, wherein the petroleum solvent-extracted oil is a bright stock solvent-extracted fraction extracted in the crude oil refining process.

13. A paving composition comprising a colourable binder composition according to claim 2 and aggregate.

14. A paving composition comprising a colourable binder composition according to claim 3 and aggregate.

15. A paving composition comprising a colourable binder composition according to claim 4 and aggregate.

16. A paving composition comprising a colourable binder composition according to claim 5 and aggregate.

17. A colour paving composition comprising a colourable binder composition according to claim 2, aggregate and pigment.

18. A colour paving composition comprising a colourable binder composition according to claim 3, aggregate and pigment.

19. A colour paving composition comprising a colourable binder composition according to claim 4, aggregate and pigment.

20. A colour paving composition comprising a colourable binder composition according to claim 5, aggregate and pigment.

* * * * *